United States Patent [19]

Guezennec et al.

[11] Patent Number: 5,587,190
[45] Date of Patent: Dec. 24, 1996

[54] DIETARY DRINK INTENDED TO ENABLE SUSTAINED ACTIVITY

[75] Inventors: Yannick Guezennec, Fontainebleau; Joseph Koziet, Villiers Sur Marne; Michel Thiry, Vigneux Sur Seine, all of France

[73] Assignee: Pernod Ricard, Paris, France

[21] Appl. No.: 408,110

[22] Filed: Mar. 21, 1995

Related U.S. Application Data

[63] Continuation of Ser. No. 78,957, Jun. 16, 1993, abandoned, which is a continuation of Ser. No. 776,634, Oct. 15, 1991, abandoned.

[51] Int. Cl.$^6$ .................................................. A23L 2/00
[52] U.S. Cl. .............................. 426/2; 426/590; 426/804
[58] Field of Search ........................... 426/590, 804, 426/2

[56] References Cited

U.S. PATENT DOCUMENTS 4,414,238  11/1983  Schmidl .......................... 426/602
4,832,975   5/1989  Yang ............................. 426/804
4,959,350   9/1990  Frokjaer ......................... 426/656
5,066,509  11/1991  van den Hoven .................. 426/592
5,066,510  11/1991  Ehrman .......................... 426/804
5,288,512   2/1994  Seiden .......................... 426/804

FOREIGN PATENT DOCUMENTS 5884541  11/1984  Japan .
0322027   6/1989  United Kingdom ............... 426/804

*Primary Examiner*—Carolyn Paden
*Attorney, Agent, or Firm*—Blakely, Sokoloff, Taylor & Zafman

[57] ABSTRACT

The present invention relates to a dietary composition intended to be absorbed before, during or after an activity, which comprises carbohydrates and lipids, said lipids constituting 10 to 55% of the calorie content of the composition.

3 Claims, 5 Drawing Sheets

COURSE OF 3 TRIATHLONS
FONTAINEBLEAU 22.05 / 10.06 / 25.06

DIETARY DRINK INTENDED TO ENABLE SUSTAINED ACTIVITY

This a continuation of application Ser. No. 08/078,957 filed Jun. 16, 1993, now abandoned which is a continuation of Ser. No. 07/776,634, filed Oct. 15, 1991, now abandoned.

BACKGROUND OF THE INVENTION

1. Field of the Invention

The present invention relates to compositions intended to be absorbed before and during activity so as to enable this activity to be sustained by limiting the effects due to depletion of the available reserves of the organism. After the activity, this composition can help to restore the glycogen reserves.

2. Description of the Related Art

It is known that during activity, the muscle must convert chemical energy, adenosine triphosphate (ATP) to mechanical energy, but the reserves of cellular ATP are small. Various sources of energy therefore exist to replace this cellular ATP.

The lactic anaerobiosis pathway calls into play the phosphocreatinine (CP) immediately available in the muscle according to the scheme CP+ADP$\leftrightarrows$ATP+creatinine, enables intense and brief exercises.

The anaerobic glycolysis pathway uses the blood glucose and the muscle glycogen but causes the formation of lactic acid and is therefore limited by the capacity of the organism to use lactates. It enables medium term physical activities.

Finally, activities of long duration require aerobic processes which involve complete oxidation of the glucose derived from glycogenolysis and gluconeogenesis and then oxidation of the free fatty acids derived from the hydrolysis of body fats which take over the supply of energy.

A critical oxygen consumption, specific to an individual and to his training, exists beyond which the organism becomes tired. This $VO_2$ max is improved by training.

Normally, an adult individual uses about 2,400 calories per day, that is 100 calories/hour. During an intense activity, this consumption may increase to 1,200 calories/hour, which is equivalent to 60 molecules of ATP.

The organism risks, in this case, being subject to breakdowns, the most frequent causes of which are hypoglycemia, depletion of muscle glycogen and dehydration.

Efforts were therefore made to provide nutritional supplements intended to avoid the occurrence of these breakdowns which limit performances and have adverse effects on the health of athletes.

Most fortifying products are predominantly carbohydrates in the form of glucose in order to respond to the immediate carbohydrate needs of muscle activity. However, these products, especially when they are drinks to be absorbed during an activity of long duration, may lead to very uncomfortable digestive disorders.

Moreover, absorption of this type of product at the beginning of an exercise leads to a secretion of insulin by the organism which may cause a hypoglycemic reaction. Subsequently, the supply of glucose obstructs endogenous lipolysis and therefore the use of free fatty acids by the muscle, which are an important source of energy during an activity of long duration.

SUMMARY OF THE INVENTION

In order to overcome these disadvantages, the applicant has discovered entirely surprisingly that a composition containing essentially a combination of carbohydrates and lipids gives substantially improved results, demonstrated in particular by the determination of various blood parameters.

Accordingly, the present invention relates to a dietary composition intended to be absorbed before, during or after an activity, which comprises carbohydrates and lipids, said lipids constituting 10 to 55% of the calorie content of the composition.

In addition to carbohydrates and lipids, the composition can of course contain all additives necessary for its formulation, such as preservatives, flavouring agents, colouring agents, thickening agents, gelling agents, etc.

Activity is understood as meaning the voluntary calling into play of muscles, by physiological and psychological phenomena, which tends to cause a higher than normal activity of a group of muscles or of the whole organism. This activity requires an increase in the heart rate and the respiratory rhythm and leads to an increase in the energy needs.

The composition according to the invention makes it possible to sustain an activity by limiting the sudden occurrence of fatigue and overexertion caused by the lack of correspondence between the nutritional supplies and the energy needs.

The energy supply of said composition will consist of lipids for at least 10% and up to 55% of the total calories. Part of the energy supply will be in the form of carbohydrates.

In particular, the present invention relates to a fortifying composition in which all or part of the lipid constituents, which are in the proportions defined above, consist of medium chain triglycerides. These medium chain triglycerides result from the esterification of glycerol by saturated or unsaturated $C_6$ to $C_{10}$ fatty acids.

More specifically, a dietary composition according to the invention may comprise lipid constituents in a proportion of 10 to 55% of the total calorie supply, consisting of medium chain triglycerides and also long chain triglycerides.

The medium chain triglycerides preferably represent at least 40% of the total lipids.

In another preferred manner, the long chain triglycerides contain at least 30% of polyunsaturated fatty acids. The use of fish oils in the compositions according to the invention is to be avoided.

The carbohydrates preferably represent 30 to 90% of the calorie content of the composition.

According to one feature of the invention, the dietary composition such as has been defined comprises, by way of carbohydrate constituent, fructose and glucose.

More particularly, the present invention relates to a fortifying composition comprising carbohydrates and lipids in the proportions defined above and in which the fructose represents at least 40% of the total carbohydrates.

Particularly favorable results are obtained for compositions according to the invention in which the carbohydrates/lipids concentrations ratio is greater than or equal to 1. In a preferred manner, the fructose lipids ratio in the compositions according to the present invention is greater than or equal to 0.5.

In effect, studies carried out by means of carbon 13-labeled substrates have shown that fructose as well as medium chain triglycerides (in particular with 8 carbon atoms) are rapidly oxidized by the human organism during physical exercise to carbon dioxide gas, thus providing energy which can be used directly for physical exercise and which is comparable to that provided by glucose or starch.

The long chain fatty acids are oxidized only slowly.

In contrast, if the insulin response of the 4 energy substrates considered is compared, it is observed that only glucose and starch actually lead to a high insulinemia whereas fructose and triglycerides do not have this disadvantage.

Furthermore, various blood parameters which indicate the energy potential and the suffering of the organism may be determined in sportsmen during the phases of activity and recuperation. Free fatty acids, ketonic substances, glucose, lactate and glycerol may thus be determined during a sports competition, in individuals who have absorbed a drink according to the invention: the plasma levels reveal a more efficient use of energy substrates supplied in the form of lipids and a better mobilization of reserve fats relative to those observed with traditional compositions based on carbohydrate.

According to one of its features, the present invention relates to compositions intended to be absorbed during activity, and containing in the product ready to be absorbed; glucose at a concentration of between about 10 and 35 g/l, fructose at a concentration of between 10 and 35 g/l, long chain triglycerides at a concentration of between about 1 and 10 g/l and medium chain triglycerides at a concentration of between about 1 and 10 g/l.

According to a preferred embodiment, the present invention relates to a composition which contains 10 g/l of glucose, fructose at a concentration of 10 g/l, long chain triglycerides at a concentration of 5 g/l and medium chain triglycerides at a concentration of 5 g/l.

In another feature, the composition according to the invention contains 20 g/l of glucose, 20 g/l of fructose, 2,5 g/l of long chain triglycerides and 2,5 g/l of medium chain triglycerides.

According to one of its preferred features, the composition according to the invention is provided in liquid form.

This presentation makes it possible, in addition to the optimized energy supply which is ensured by the compositions according to the invention, to compensate the water losses occurring during a muscle activity by sudation intended to combat the tendency towards a rise in body temperature (for example, the sudoral rate of a marathon runner is 1 to 2 liters/hour).

These compositions will therefore have the double advantage of responding to the energy needs of the organism and of preventing dehydration, by ingestion before, during and/or after the activity.

Furthermore, these compositions possess a very good digestive tolerance, contrary to what can be observed with carbohydrate drinks, especially those with a high osmolar power.

The composition according to the invention may be provided in a concentrated or dry form for later dilution. The final concentrations in the ready-to-drink product can vary as a function of the conditions of the sporting event, and the concentration thresholds depend on the dilution carried out by the consumer of the product.

Accordingly, the present invention relates to a liquid fortifying composition, 10 to 55% of whose calorie supply consists of lipids such as has been defined above, and which is observed in an amount of 2 to 2.5 l during an activity for example during an activity of 2 to 3 hours; this being without causing gastralgias.

According to another feature of the invention, the composition may be provided in the form of tablets, pastes or biscuits intended to be absorbed before, during or after the activity, optionally rediluted with water by the user.

The following examples are intended to illustrate the invention without in any way limiting its scope.

BRIEF DESCRIPTION OF THE DRAWINGS

In these examples, reference will be made to the following figures.

DESCRIPTION OF THE PREFERRED EMBODIMENT

Example 1

Study of the Metabolism of Various $^{13}$C-labeled Substrates

Figure 1:
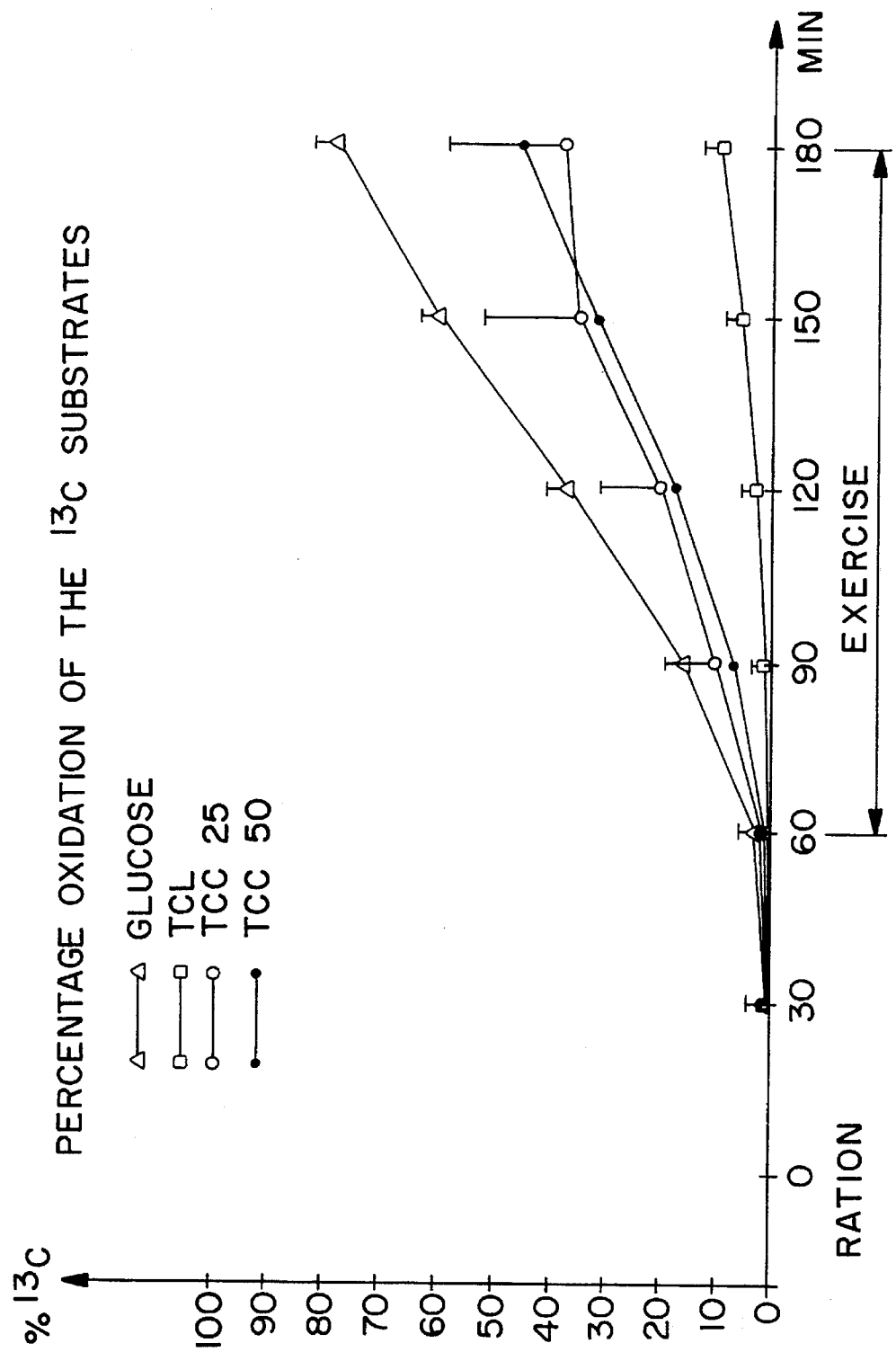
FIG. 1: Variation of the levels of oxidation of $^{13}$C-labeled substrates: glucose, long chain triglycerides (TCL), medium chain triglycerides (TCC) at two doses, 25 and 50 g per os.
Figure 2:
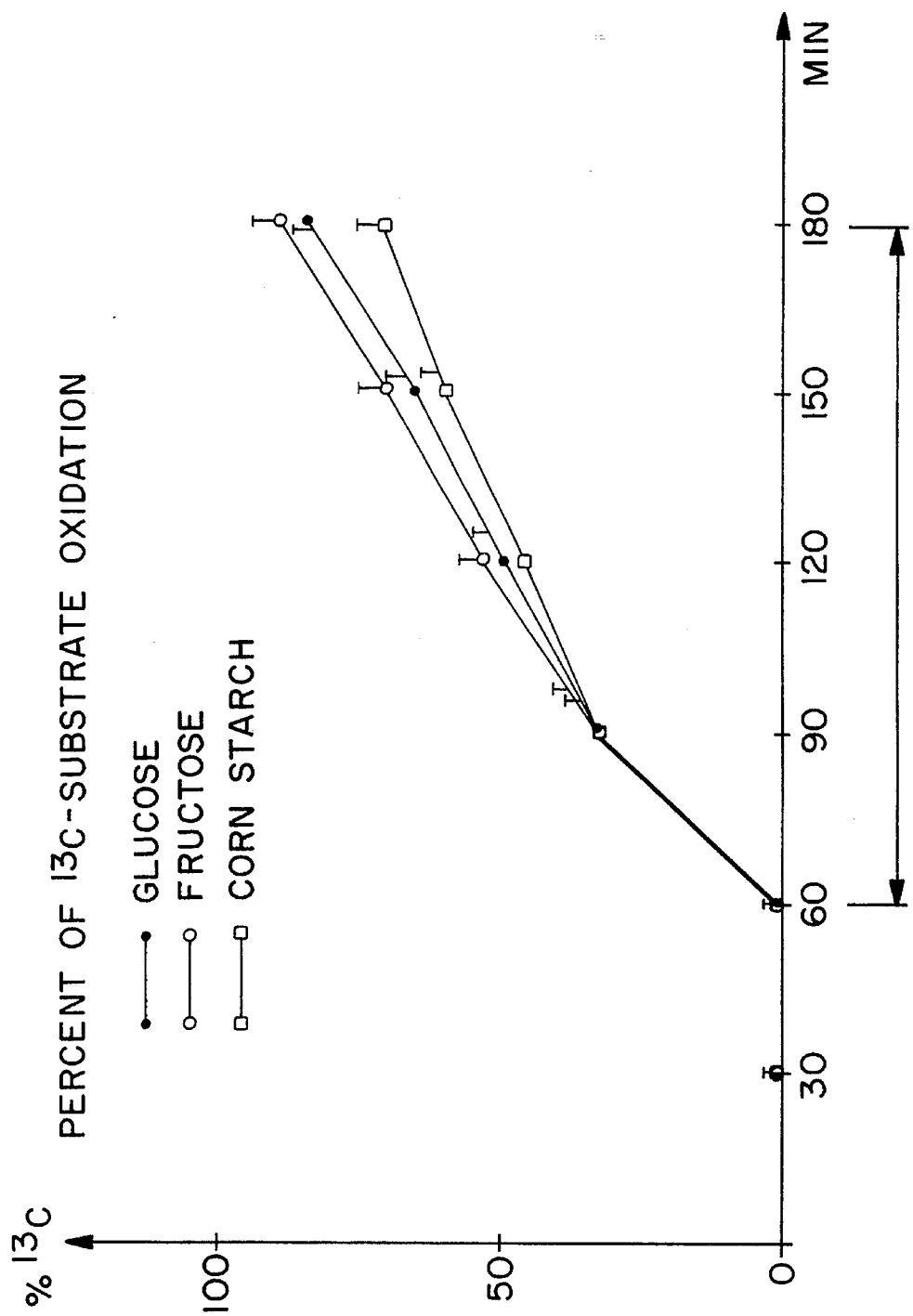
FIG. 2: Variation of the levels of oxidation of $^{13}$C-labeled substrates: glucose, fructose, starch.

FIGS. 1 and 2 make it possible to compare the use of various carbon substrates as energy source.

This use is monitored by the variation of the plasma levels of oxidized substrates.

It is thus demonstrated that fructose and medium chain triglycerides provide energy which can be rapidly used for physical exercise, which is comparable to that provided by glucose or starch.

The long chain fatty acids are only slowly oxidized and generate energy over a longer period.

Triglycerides and fructose in addition possess the advantage of not leading to insulinemic reaction, contrary to what is observed with glucose or starch.

Example 2

Comparison of Performances of a Tradition Fortifying Drink and a Drink According to the Invention Trained sportsmen were provided with either a traditional carbohydrate drink (A) or a fortifying drink in which carbohydrates and lipids are combined (B) during a triathlon competition (1,500 m swimming—40 km cycling —10 km running).

| | Composition of two drinks | | | | |
|---|---|---|---|---|---|
| A<br>SUBSTRATE | CONCENTRATION | ENERGY<br>VALUE (Kcal) | B<br>SUBSTRATE | CONCENTRATION | ENERGY<br>VALUE (Kcal) |
| GLUCOSE AND<br>MALTODEXTRIN | 76 g/l | 304 | GLUCOSE | 10 g/l | 40 |
| | | | FRUCTOSE | 10 g/l | 40 |
| | | | TRIGLYCERIDES | | |
| | | | medium chain | 5 g/l | 35 |
| | | | long chain | 5 g/l | 45 |
| | | | | | 160 |

The metabolic parameters were determined after each event of each triathlon by blood sampling.

Figure 3:
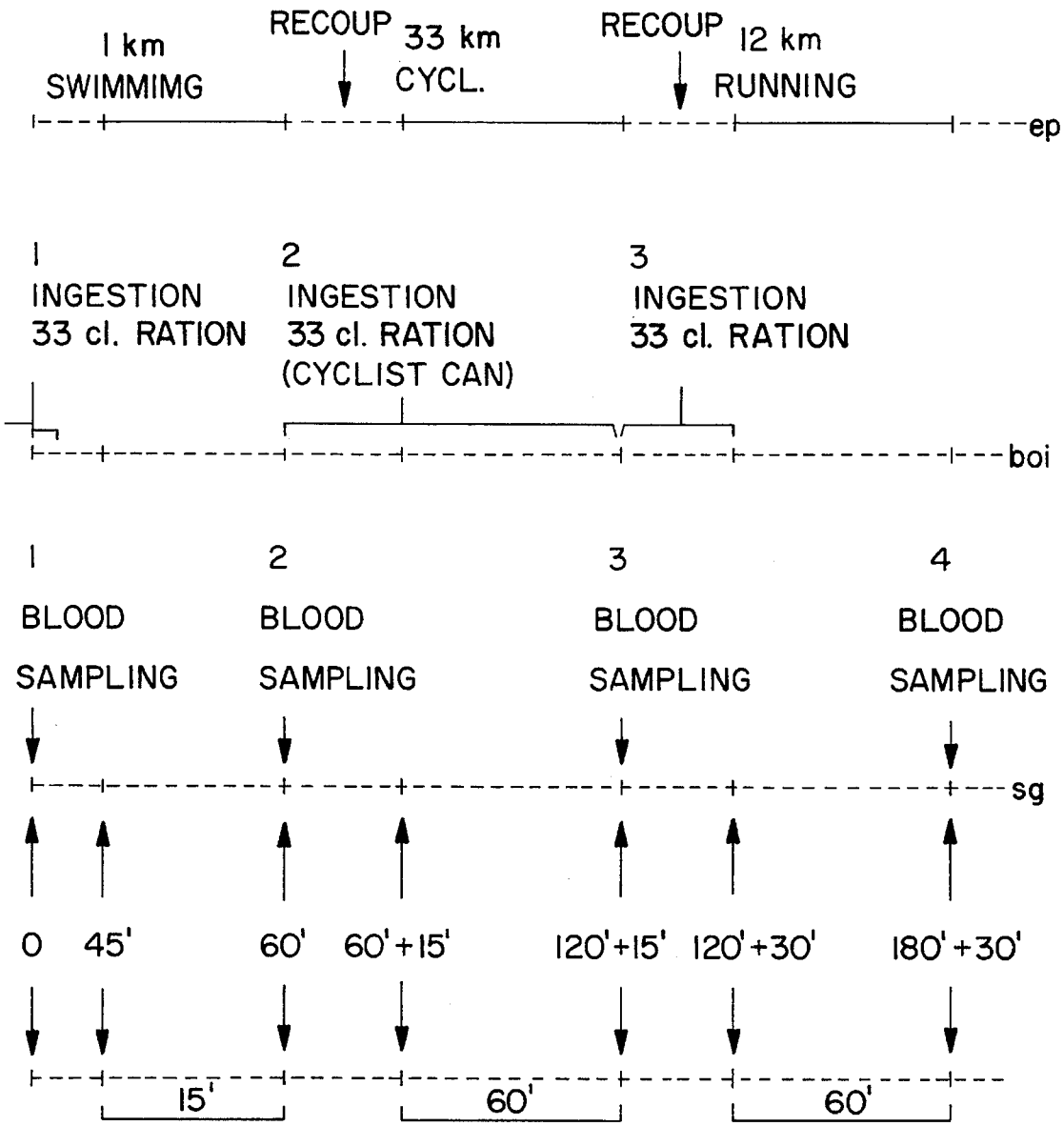
FIG. 3: Experimental procedure followed during the course of triathlons.

FIG. 3 shows the experimental procedure.

The blood parameters determined were:

free fatty acids, ketonic substances, glucose, lactate, glycerol.

The results were analyzed using 2 statistical techniques:

variance analysis, principal component analysis.

The two techniques lead to the same conclusion.

Figure 4:
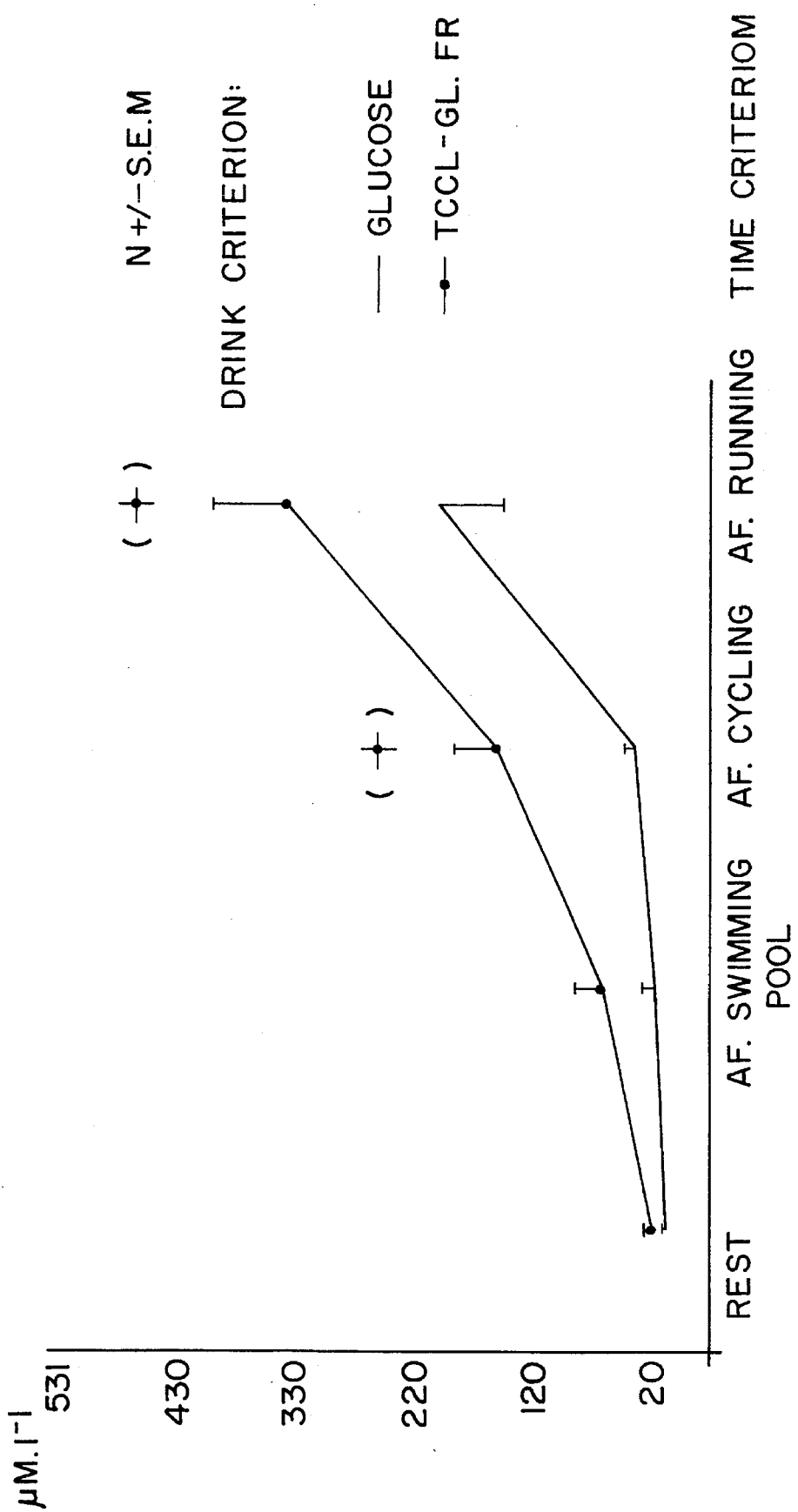
FIG. 4: Variation of the plasma levels of glycerol in individuals who have absorbed the drinks A and B respectively.
Figure 5:
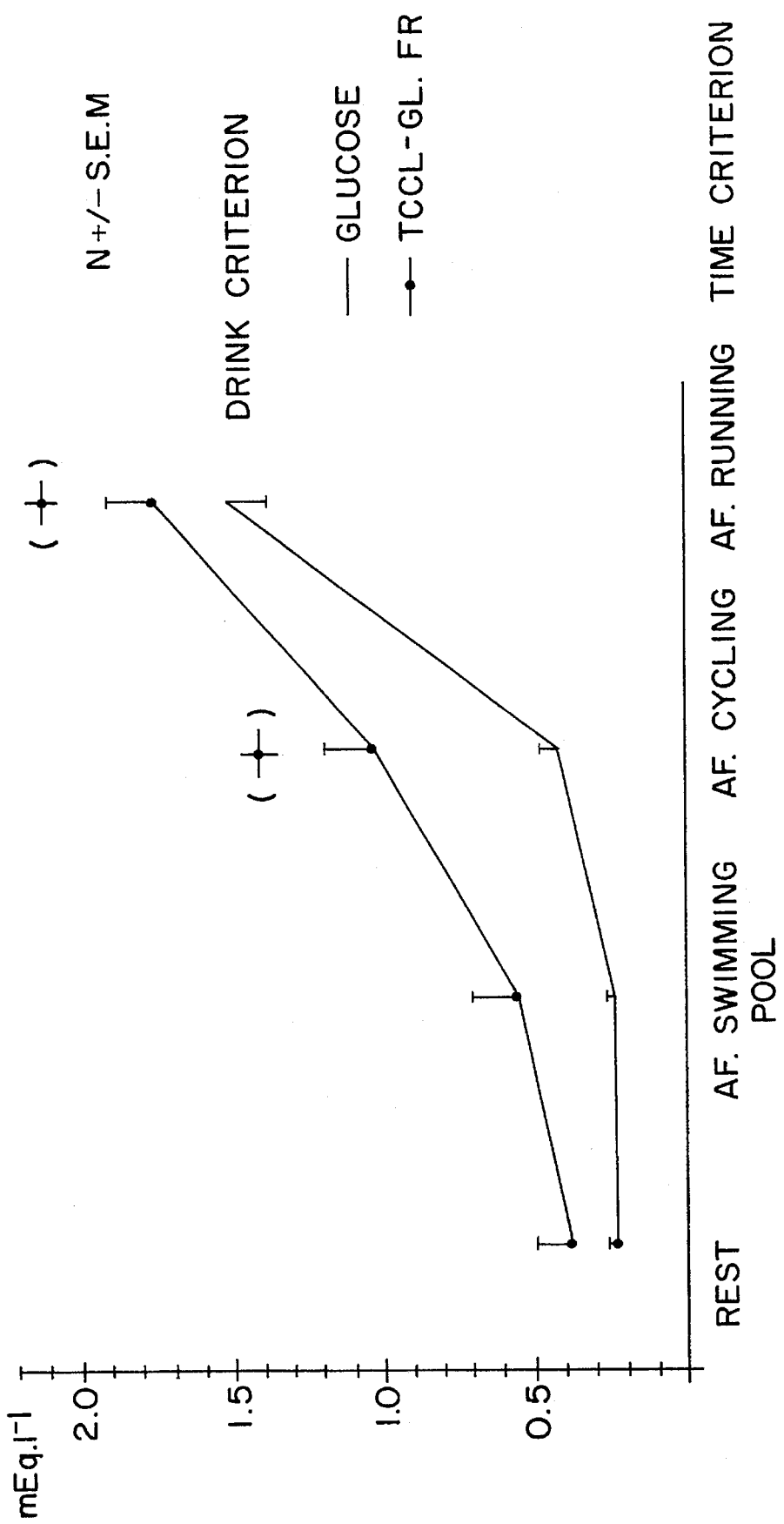
FIG. 5: Variation of the plasma levels of free fatty acids in individuals who have absorbed the drinks A and B respectively.

The drink B causes the appearance during the event of a higher plasma level of glycerol and free fatty acids (cf. FIGS. 4 and 5).

This result is significant. In effect, the consumption at regular intervals of a drink containing only carbohydrates inhibits endogenous lipolysis. In contrast, the drink containing triglycerides promotes lipolysis which yields free fatty acids and glycerol to which are added the products of triglyceride hydrolysis. The free fatty acids are thus available earlier for oxidation by the muscle. Furthermore, the glycerol participates in maintaining glycemia by gluconeogenesis.

Furthermore, it was observed that the drink B did not lead to any digestive disorder whereas it is known that during a competition of long duration, 30% of individuals exhibit digestive disorders which are all the more intense because the osmolar power of the drink is high.

A 100-km foot-race competition confirmed the good gastric tolerance of the drink B whose consumption was 2.0 l to 2.5 l None of the 5 runners suffered gastralgias.

We claim:

1. A method of enabling sustained activity comprising supplying to a mammal a composition comprising carbohydrates and lipids, said lipids constituting 10 to 55% of the calorie content of the composition and consisting of medium chain triglycerides and long chain triglycerides, said carbohydrates constituting 30% to 90% of the calorie con the concentration ratio of carbohydrates to lipids is greater than or equal to 1 and wherein at least a portion of said carbohydrates comprise fructose, said composition being supplied in liquid form before, during or after said sustained activity.

2. The method of claim 1 comprising supplying to said mammal 2 to 2.5 liters of said composition over a 2 to 3 hour period.

3. The method of claim 1 wherein said mammal is a human.

* * * * *

UNITED STATES PATENT AND TRADEMARK OFFICE
CERTIFICATE OF CORRECTION

PATENT NO. : 5,587,190
DATED : December 24, 1996
INVENTOR(S) : Guezennec et al.

It is certified that error appears in the above-indentified patent and that said Letters Patent is hereby corrected as shown below:

In column 1 at line 25, please delete " enables " and insert -- and enables --.

In column 6, claim 1 at line 30, please delete " con " and insert -- content and wherein --.

Signed and Sealed this

Fourteenth Day of October, 1997

Attest:

BRUCE LEHMAN

Attesting Officer

Commissioner of Patents and Trademarks